(12) United States Patent
Zhu et al.

(10) Patent No.: US 8,279,832 B2
(45) Date of Patent: Oct. 2, 2012

(54) METHOD, SYSTEM AND DEVICE FOR CONVERTING SESSION CONTROL SIGNALING

(75) Inventors: Dongming Zhu, Shenzhen (CN); Hengliang Zhang, Shenzhen (CN); Chunyan Ding, Shenzhen (CN); Songhai Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 532 days.

(21) Appl. No.: 12/496,061

(22) Filed: Jul. 1, 2009

(65) Prior Publication Data

US 2009/0262706 A1 Oct. 22, 2009

Related U.S. Application Data

(63) Continuation of application No. PCT/CN2008/072456, filed on Sep. 23, 2008.

(30) Foreign Application Priority Data

Sep. 30, 2007 (CN) .......................... 2007 1 0181007

(51) Int. Cl.
*H04W 4/00* (2009.01)
*H04L 12/66* (2006.01)
*H04W 36/00* (2009.01)

(52) U.S. Cl. ........ 370/331; 370/353; 370/354; 455/436; 455/437; 455/438; 455/439; 455/440; 455/441; 455/442

(58) Field of Classification Search .......................... None
See application file for complete search history.

(56) References Cited

U.S. PATENT DOCUMENTS

2006/0268900 A1* 11/2006 Larsson et al. ................ 370/401
2009/0190550 A1* 7/2009 Giustina et al. ............... 370/331

FOREIGN PATENT DOCUMENTS

| CN | 1300151 A | 6/2001 |
|---|---|---|
| CN | 1394455 A | 1/2003 |
| CN | 1434574 A | 8/2003 |
| CN | 1784067 A | 6/2006 |
| CN | 1874327 A | 12/2006 |
| CN | 1929434 A | 3/2007 |
| CN | 100471182 C | 3/2009 |
| CN | 101400091 B | 2/2012 |
| EP | 1763185 A1 | 3/2007 |
| WO | WO 2006/126959 A2 | 11/2006 |

OTHER PUBLICATIONS

Written Opinion in corresponding PCT Application No. PCT/CN2008/072456, mailed Dec. 4, 2008.

(Continued)

*Primary Examiner* — Ayaz Sheikh
*Assistant Examiner* — Sori Aga
(74) *Attorney, Agent, or Firm* — Leydig, Voit & Mayer, Ltd.

(57) ABSTRACT

A method, system, and device for converting session control signaling are provided. The method includes at least one of the following steps: a first adaptation unit converts a session control signaling message of a circuit switched (CS) session leg into a session control signaling message of an IP multimedia subsystem (IMS) session leg; or the first adaptation unit converts a session control signaling message of an IMS session leg into a session control signaling message of a CS session leg. In embodiments of the present invention, an adaptation unit intercepts a CS signaling message after an inter-mobile switching center (MSC) handover, and converts CS signaling messages to IMS signaling messages and vice versa, so that the IMS domain may continue to control a session after the inter-MSC handover.

19 Claims, 7 Drawing Sheets

OTHER PUBLICATIONS

Extended European Search Report in corresponding European Application No. 08800945.1-1244, mailed Mar. 29, 2010.

"3$^{rd}$ Generation Partnership Project; Technical Specification Group Services and System Aspects; IP Multimedia System (IMS) centralized services (Release 8)," *3GPP*, 3GPP TR 23.892 V1.2.1 (Sep. 2007).

"3$^{rd}$ Generation Partnership Project; Technical Specification Group Core Network and Terminals; Signalling interworking for supplementary services (Release 7)," *3GPP*, 3GPP TS 29.011 V7.0.0 (Jun. 2007).

"3$^{rd}$ Generation Partnership Project; Technical Specification Group Core Network and Terminals; Handover procedures (Release 7)," *3GPP*, 3GPP Ts 23.009 V7.0.0 (Mar. 2007).

* cited by examiner

METHOD, SYSTEM AND DEVICE FOR CONVERTING SESSION CONTROL SIGNALING

CROSS-REFERENCE TO RELATED APPLICATIONS

This application is a continuation of International Patent Application No. PCT/CN2008/072456, filed Sep. 23, 2008, which claims priority to Chinese Patent Application No. 200710181007.8, filed Sep. 30, 2007, both of which are hereby incorporated by reference in their entirety.

FIELD OF THE INVENTION

The present invention relates to communication technologies, and in particular, to a method, system, and device for converting session control signaling after an inter-mobile switching center (MSC) handover occurs on telecom services that access an IP multimedia subsystem (IMS) through a circuit switched (CS) domain.

BACKGROUND OF THE INVENTION

In the evolution to IMS networks, CS networks may coexist with IMS networks for a period of time. To decrease the operation and management cost, operators may want to deploy services in the IMS domain in a centralized way. In this way, users can access these services no matter whether they access through the CS domain or other IP-connectivity access network (IP-CAN) domains. In the conventional art, however, a media gateway control function (MGCF) can provide only basic session control by interworking with the IMS due to the capabilities of the existing integrated service user part (ISUP) or the bearer independent call control (BICC). In this mode, the IMS domain cannot provide session control and service continuity control for supplementary services.

FIG. 1 shows a structure of a system for accessing a service to an IMS network through the CS domain in the conventional art. As shown in FIG. 1, an access adaptation unit is installed between a visited mobile switching center (VMSC) and a user equipment (UE). The access adaptation unit intercepts a part of session control signaling between the UE or a radio access network (RAN) and the VMSC, converts the intercepted session control signaling into the Session Initiation Protocol (SIP) signaling, and then forwards the SIP signaling to the IMS domain. The access adaptation unit may also convert the SIP signaling from the IMS domain into circuit signaling and send the circuit signaling to the UE through an access network so that services are uniformly controlled in the IMS domain. The access adaptation unit may establish a session bearer via the interworking between the VMSC, the MGCF, and the IMS, or directly control a medium gateway (MGW) to establish the bearer with an opposite device. As shown in FIG. 1, the section between the UE and the access adaptation unit in an entire session is called a CS session leg and the corresponding session control information is transmitted as CS signaling. The section between the access adaptation unit and the IMS network is called an IMS session leg and the corresponding session control information is transmitted as SIP signaling. To perform correct signaling adaptation and conversion between the two session legs, the access adaptation unit needs to keep the correspondence of certain session information during session setup. For example, the session identifier of the CS session leg is transaction identifier (TI) in layer 3 signaling in the CS domain and the session identifier of the IMS session leg is CALL-ID and remote contact address in SIP signaling. The foregoing information may be referred to as conversion-related information.

In the original CS domain, the signaling flowchart after an inter-MSC handover is as shown in FIG. 2. The UE sets up a session with the remote UE through the VMSC-A. The VMSC-A coordinates and controls all the sessions of the UE. The UE transmits session control signaling messages to other remote devices and networks through the path represented by the solid line in FIG. 2. When the UE moves and is handed over to the VMSC-B, the session control signaling path changes and the UE transmits session control signaling messages to the remote network through the path represented by the broken line in FIG. 2. In this case, the VMSC-A still coordinates and controls all the sessions of the UE but the VMSC-B only transparently transmits the session control signaling between the UE and the VMSC-A through the E-interface.

During the implementation of the present invention, the inventor discovers at least the following problems in the conventional art:

The existing solution supports only the functions of accessing UEs to the IMS in the same MSC and exercising service control in the IMS domain. When the UEs are handed over to another MSC, the session control is not supported and no services may be provided for the users in the IMS domain.

SUMMARY OF THE INVENTION

Embodiments of the present invention provide a method, system, and device for converting session control signaling so that CS signaling and IMS signaling may be still converted mutually after an inter-MSC handover.

A method for converting session control signaling, wherein a first adaptation unit is on a CS signaling path after an inter-MSC handover, and the method includes at least one of the following steps: (1) converting, by the first adaptation unit, a session control signaling message of a CS session leg into a session control signaling message of an IMS session leg; or (2) converting, by the first adaptation unit, a session control signaling message of an IMS session leg into a session control signaling message of a CS session leg.

A system for converting session control signaling includes a UE, an initial session processing node, and a first adaptation unit, wherein: (1) the first adaptation unit is on the initial session processing node, and an after-handover session processing node exists on a signaling path between the first adaptation unit and the UE; (2) the first adaptation unit is adapted to convert a session control signaling message of a CS session leg into a session signaling message of an IMS session leg, or convert a session control signaling message of an IMS session leg into a session control signaling message of a CS session leg; and (3) the session control signaling message of the CS session leg connected to the first adaptation unit is an E-interface signaling message and the session control signaling message of the IMS session leg connected to the first adaptation unit is a SIP signaling message.

An adaptation unit includes: (1) a conversion-related information acquiring subunit, adapted to acquire conversion-related information of a CS session leg and an IMS session leg from a second adaptation unit; and (2) a signaling converting subunit, connected to the conversion-related information acquiring subunit and adapted to perform signaling conversion between a CS domain and an IMS domain according to the conversion-related information.

Another system for converting session control signaling includes a UE, an initial session processing node, an after-handover session processing node, and a first adaptation unit, where: (1) the first adaptation unit is on the after-handover session processing node; (2) the first adaptation unit is adapted to convert a session control signaling message of a CS session leg into a session signaling message of an IMS session leg, or convert a session control signaling message of an IMS session leg into a session control signaling message of a CS session leg; and (3) the session control signaling message of the CS session leg connected to the first adaptation unit is an A-interface signaling message or an Iu interface signaling message and the session control signaling message of the IMS session leg connected to the first adaptation unit is a SIP signaling message.

Another adaptation unit includes: (1) a conversion-related information acquiring subunit, adapted to acquire conversion-related information of a CS session leg and an IMS session leg; and (2) a signaling converting subunit, connected to the conversion-related information acquiring subunit and adapted to perform signaling conversion between a CS domain and an IMS domain according to the conversion-related information.

Different from the conventional art, in technical solutions according to embodiments of the present invention, an adaptation unit intercepts a CS signaling message after an inter-MSC handover, and converts CS signaling messages to IMS signaling messages and vice versa, so that the IMS domain may continue to control sessions after the inter-MSC handover.

BRIEF DESCRIPTION OF THE DRAWINGS

For better understanding of the technical solution in the embodiments of the present invention or its background environment, the following describes the accompanying drawings that are used in the embodiments of the present invention or in its environment. Obviously, the following drawings are some exemplary embodiments of the present invention only. Those skilled in the art may acquire other drawings based on the following drawings without creative work.

DETAILED DESCRIPTION OF THE EMBODIMENTS

The technical solution of the present invention is hereinafter described in detail with reference to the accompanying drawings. It is evident that the embodiments are only exemplary embodiments of the present invention and the present invention is not limited to such embodiments. Other embodiments that those skilled in the art acquire based on the embodiments of the present invention without creative work also fall in the scope of protection of the present invention.

Figure 1:
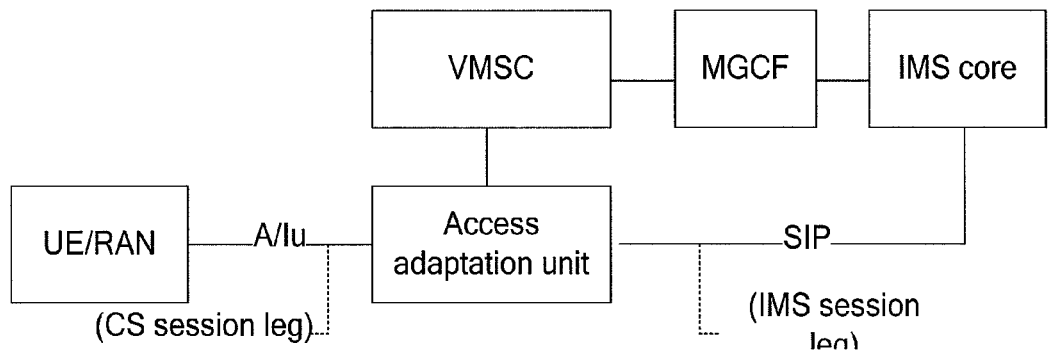
FIG. 1 shows a structure of a system for accessing a service to an IMS network through a CS domain in the conventional art.
Figure 2:
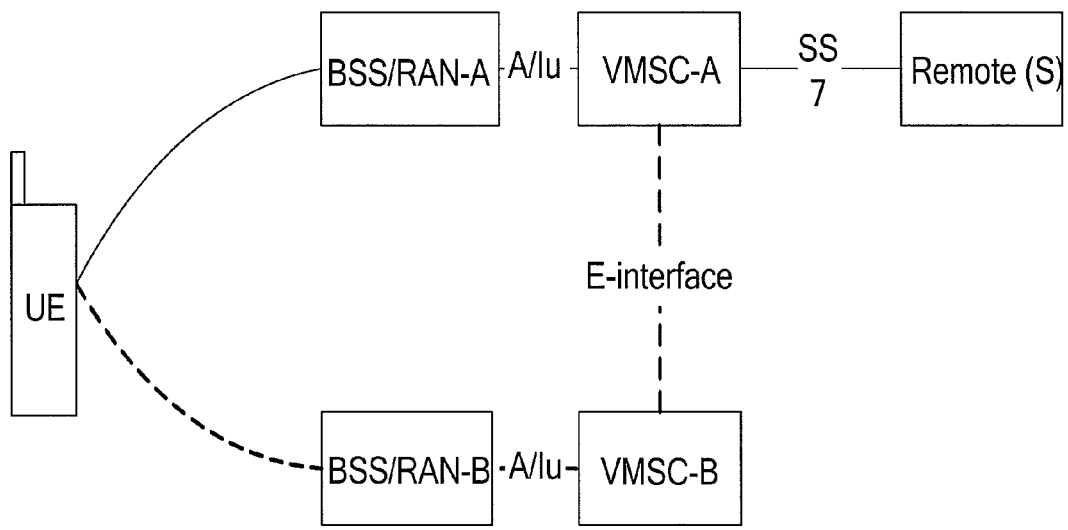
FIG. 2 shows a schematic diagram illustrating a CS inter-MSC handover in the conventional art.
Figure 3:
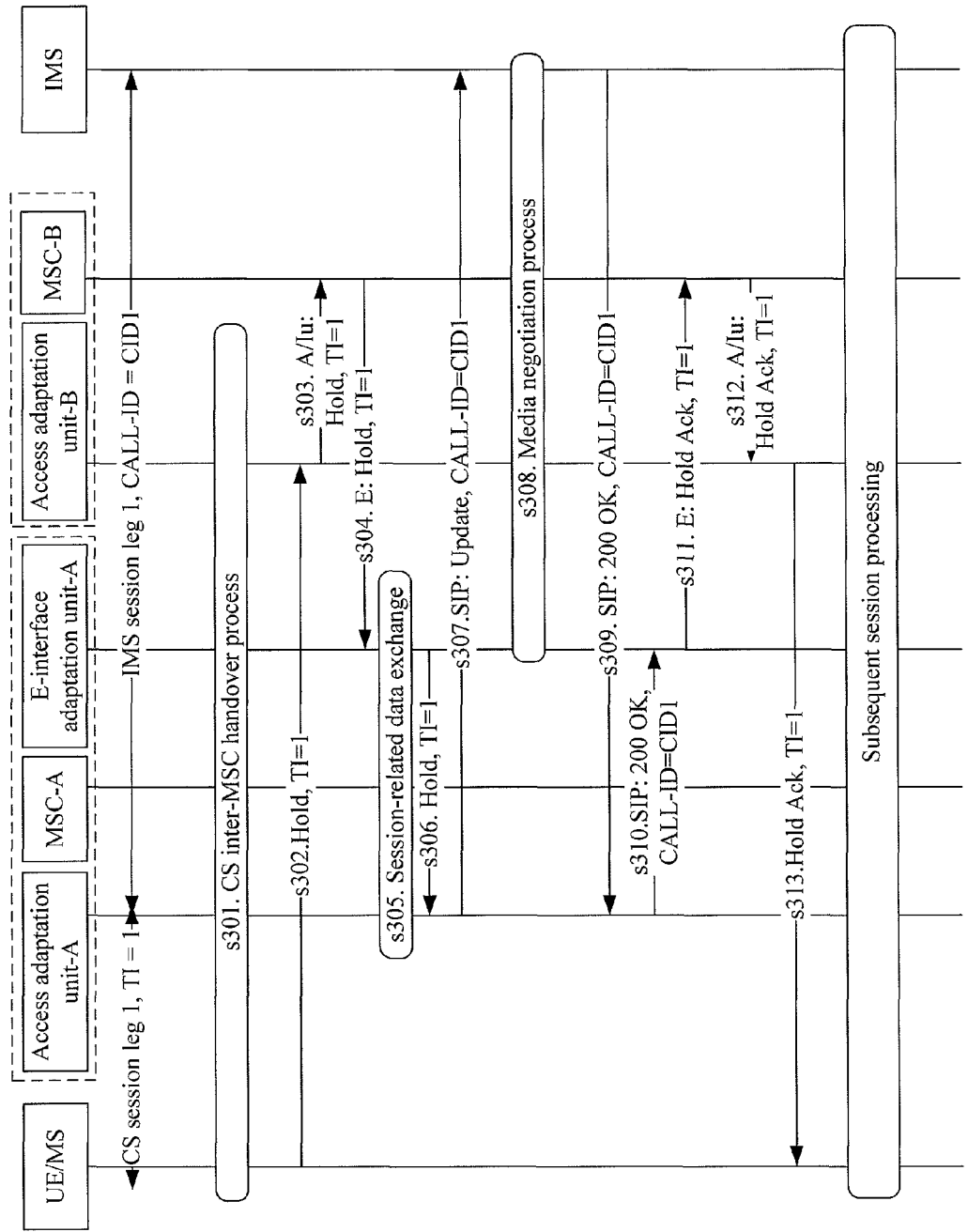
FIG. 3 is a flowchart of a first embodiment of the present invention.

In the first embodiment of the present invention, after an inter-MSC handover occurs, the target MSC transparently transmits CS signaling through an E-interface to the E-interface adaptation unit in the MSC where a session is set up. Then the E-interface adaptation unit performs signaling interception and conversion. The UE sets up a session through an access adaptation unit-A, an MSC-A, and an IMS network. For the session, the identifier of the CS session leg is 1 and that of the IMS session leg is CID1. An inter-MSC handover occurs because the UE or mobile station (MS) moves. The UE is handed over from MSC-A to MSC-B. After the handover, the session control signaling message sent from the UE is transmitted to the access adaptation unit-B in front of the MSC-B through the RAN. Then the access adaptation unit-B transparently transmits the session control signaling message to the MSC-B. According to the process of the CS inter-MSC handover, the MSC-B does not exercise service control but transparently transmits the message to the MSC-A through the E-interface. Then the MSC-A exercises service control. In the embodiment of the present invention, the E-interface adaptation unit-A is added to intercept signaling on the E-interface. The E-interface adaptation unit-A converts the session control signaling message that the MSC-B transparently transmits through the E-interface into a SIP message, and transmits the SIP message to an IMS network for control. According to the connection between the access adaptation unit and the IMS network, the access adaptation unit-A or E-interface adaptation unit-A may communicate with the IMS network in other modes such as through an unstructured supplementary service data (USSD) message in addition to using a SIP message. The E-interface adaptation unit in the embodiment of the present invention is a new interface adaptation unit. The unit converts CS E-interface signaling to IMS SIP signaling and vice versa according to the session-related information in the CS domain and the IMS domain. As required, the E-interface adaptation unit may be deployed independently or deployed with other functional entities (such as an MSC or an access adaptation unit) to share functional parts. As shown in FIG. 3, the specific implementation process includes the following steps.

Step s301: The UE performs a handover from MSC-A to MSC-B according to the standard CS handover process.

Step s302: The user operates the man-machine interface to instruct the UE to hold session 1. At this moment, the UE sends a Hold request message (a Layer 3 message) in the CS domain. When the TI in the message is set to 1, it indicates that session 1 is held. Through an RAN, the message is transmitted to the access adaptation unit-B that intercepts the A-interface or the Iu interface between the RAN and the MSC-B.

Step s303: The access adaptation unit-B does not have user data and transparently transmits the Hold request message to the MSC-B through the A-interface or the Iu interface.

Step s304: The MSC-B transparently transmits the Hold request message to the MSC-A through the E-interface.

Step s305: The E-interface adaptation unit-A intercepts the Hold request message that is transmitted to the E-interface of the MSC-A.

Step s306: The E-interface adaptation unit-A determines whether the Hold request message needs to be routed to the IMS domain. If yes, the E-interface adaptation unit-A converts the Hold request message sent from the UE into a SIP message and sends the SIP message to the access adaptation unit-A for forwarding. Or the E-interface adaptation unit-A converts the E-interface signaling message into a private interface message and transmits the private interface message to the access adaptation unit-A. Then the access adaptation unit-A converts the private interface message into a SIP message and forwards the SIP message. The E-interface adaptation unit-A may acquire the session correspondence stored during session setup or other information such as user subscription information from the access adaptation unit-A. All the information may be referred to as conversion-related information. In other embodiments, the information is the same and is not described further. In the session correspondence, for example, the session identifier of the CS session leg is TI in layer 3 signaling in the CS domain and that of the IMS session leg is CALL-ID and remote contact address in SIP signaling. The E-interface adaptation unit-A determines whether the Hold request message needs to be routed to the IMS for processing according to conversion-related information and performs signaling adaptation and conversion. When the E-interface adaptation unit-A and the access adaptation unit-A are in different functional modules of the same entity, the E-interface adaptation unit-A may exchange the session signaling message and conversion-related information with the access adaptation unit-A through an internal interface. Otherwise, the E-interface adaptation unit may exchange the session signaling message and conversion-related information with the access adaptation unit-A through a private external interface such as a customized binary IP interface or an extended SIP interface. Step s305 may be executed at any time before step s306, which is not limited to the time point in FIG. 3.

Step s307: The access adaptation unit-A forwards the Hold request message to the IMS domain for processing.

In step s305 to step s307, the access adaptation unit-A may convert CS signaling and IMS signaling, and the E-interface adaptation unit-A only forwards the Hold request message to the access adaptation unit-A for processing.

Step s308: Media negotiation is performed on services in the IMS domain.

Step s309: The IMS returns a Hold ACK message to the access adaptation unit-A. In the message, CALL-ID is CID1.

Step s310: According to the handover status, the access adaptation unit-A sends the received Hold ACK message to the E-interface adaptation unit-A for processing.

Step s311: The E-interface adaptation unit-A converts the received Hold ACK message into an E-interface CS message and transmits the E-interface CS message to the MSC-B. The TI in the E-interface CS message is 1.

Step s312: The MSC-B does not process services but transmits the E-interface CS message to the access adaptation unit-B on the RAN.

Step s313: The access adaptation unit-B that intercepts the A-interface or Iu interface transparently transmits the E-interface CS message to the RAN and the RAN returns the E-interface CS message to the UE. Up to now, the process of holding session 1 is complete.

In this embodiment, the access adaptation unit-A and the E-interface adaptation unit-A may be deployed in the MSC-A or in a module inside the MSC. The access adaptation unit-A and the E-interface adaptation unit-A may be deployed in the same entity or independently. When they are deployed in the same entity, an internal interface is used for signaling exchange. When they are deployed independently, an external interface is used for signaling exchange. The access adaptation unit-B may be deployed in the MSC-B or in a module inside the MSC. In addition, the access adaptation unit-B may not be deployed. In this case, the signaling from the UE is directly transmitted to the MSC-B. Thus, whether the access adaptation unit-B exists does not affect the effect of this embodiment.

In this embodiment, after perceiving that this is a handover, the access adaptation unit-B does not convert the session control signaling message of the session but transparently transmits the message to the MSC-B. Then the MSC-B transparently transmits the message to the E-interface adaptation unit-A through the E-interface. The E-interface adaptation unit-B may be deployed in the MSC-B. Similarly, after perceiving a handover, like the access adaptation unit-B, the E-interface adaptation unit-B only transparently transmits signaling instead and does not exercise session conversion control. A handover is perceived when a handover notification message such as HANDOVER REQUEST on the A-interface or the Iu interface or MAP_PREPARE_HANDOVER on the E-interface is intercepted or when no Location Update request is received from the terminal.

If the access adaptation unit-A and the E-interface adaptation unit-A are deployed in two different physical entities, the SIP message sent from the IMS may be directly and transparently transmitted to the E-interface adaptation unit-A instead of the access adaptation unit-A. Before this operation, the E-interface adaptation unit-A or the access adaptation unit-A needs to notify the IMS domain such as an IMS CS control function (ICCF) that the SIP route address of the session is changed.

This embodiment describes only the process when a Hold request message in the CS signaling is received. If a control request message for other supplementary services or a call setup request message is received, the E-interface adaptation unit-A also converts the request message into IMS signaling. The process in other embodiments is the same and is not described further.

Figure 4:
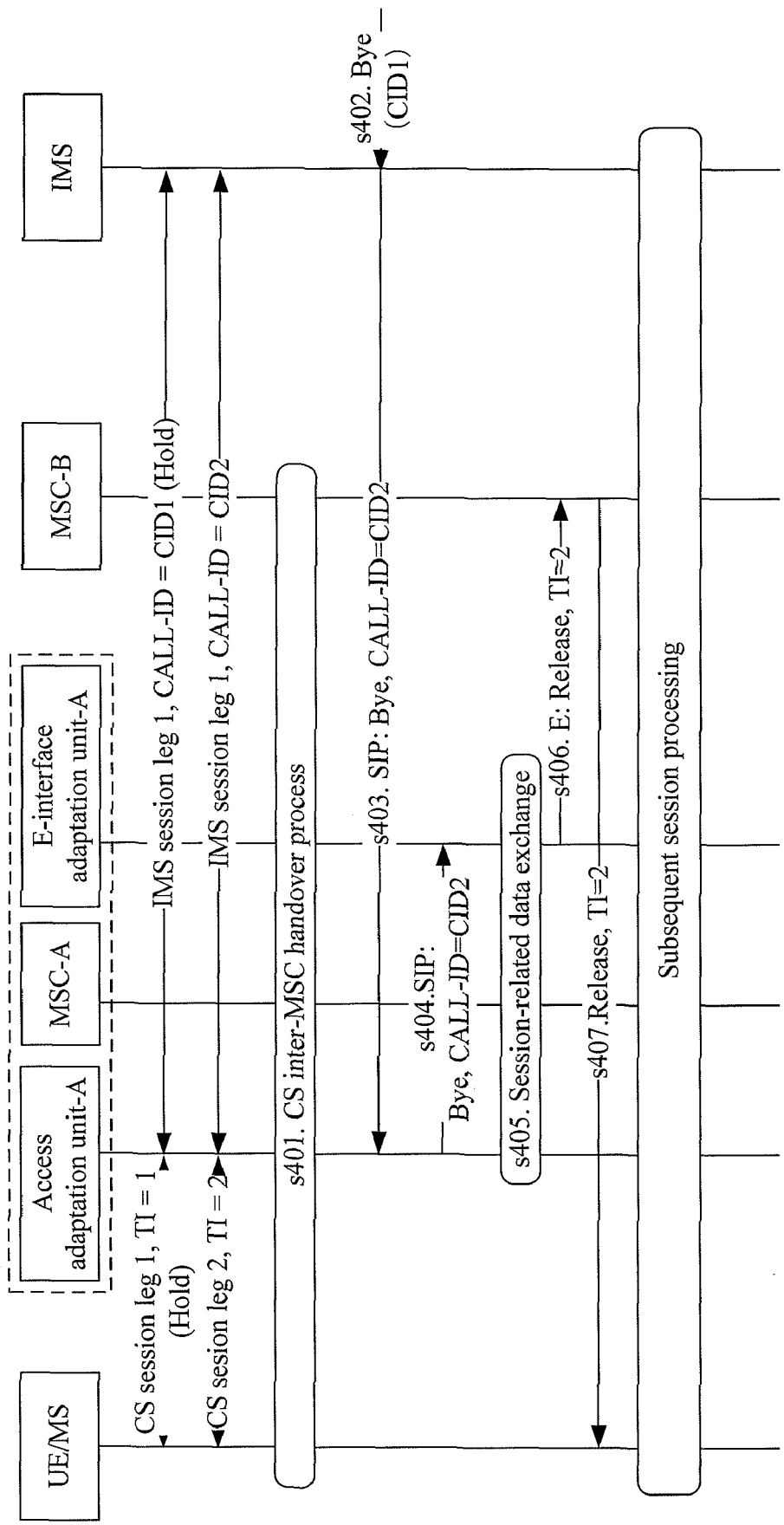
FIG. 4 is a flowchart of a second embodiment of the present invention.

In the second embodiment of the present invention, the UE has set up a session with two opposite UEs respectively through the access adaptation unit-A, the MSC-A, and the IMS network. The two sessions are identified as session 1 and session 2 respectively. For session 1, the identifier of the CS session leg is 1 and that of the IMS session leg is CID1. For session 2, the identifier of the CS session leg is 2 and that of the IMS session leg is CID2. An inter-MSC handover occurs because the UE moves. As shown in FIG. 4, the specific implementation process includes the following steps.

Step s401: The UE sets up two sessions through the access adaptation unit-A and then initiates a handover from MSC-A to MSC-B.

Step s402 and step s403: During conversation, the opposite UE of session 2 initiates a SIP Bye message to release the session. In this case, the SIP Bye message in which CALL-ID is CID2 is sent to the access adaptation unit-A through the IMS network. Similarly, if a call setup request message or a notification or request message of the ongoing session is received, the E-interface adaptation unit-A also sends the message to the UE through the E-interface. The process in other embodiments is the same and is not described further. Moreover, according to the connection between the access adaptation unit and the IMS network, in addition to using the SIP message, the access adaptation unit-A, the E-interface adaptation unit-A and the IMS network may communicate with each other in other modes such as through a USSD message.

Step s404: According to the handover status, the access adaptation unit-A sends the SIP Bye message to the E-interface adaptation unit-A.

Step s405: The access adaptation unit-A exchanges conversion-related information with the E-interface adaptation unit.

Step s406: After acquiring conversion-related information, the E-interface adaptation unit converts the SIP Bye message into an E-interface CS message and transfers the E-interface CS message to the MSC-B. The TI in the E-interface CS message is 2.

Step s407: The MSC-B does not process the E-interface CS message. Instead, the MSC-B transfers the E-interface CS message to the RAN and the RAN returns the E-interface CS message to the UE. After receiving the E-interface CS message, the UE continues to complete the subsequent session release process.

In this embodiment, the access adaptation unit-A and the E-interface adaptation unit-A may be deployed in the MSC-A or in a module inside the MSC. The access adaptation unit-A and the E-interface adaptation unit-A may be deployed in the same entity or independently. When they are deployed in the same entity, an internal interface is used for signaling exchange. When they are deployed independently, an external interface is used for signaling exchange. In this embodiment, the access adaptation unit-B or the E-interface adaptation unit-B may also be deployed in the MSC-B. In this case, all the session control signaling is transparently transmitted to the MSC-A. Thus, whether adaptation unit-B exists does not affect the effect of the embodiment. If the access adaptation unit-A and the E-interface adaptation unit-A are deployed in two different physical entities, the SIP message sent from the IMS may be directly and transparently transmitted to the E-interface adaptation unit-A instead of the access adaptation unit-A. Before this operation, the E-interface adaptation unit-A or the access adaptation unit-A needs to notify the IMS domain (such as the ICCF) that the SIP route address of the session is changed.

Figure 5:
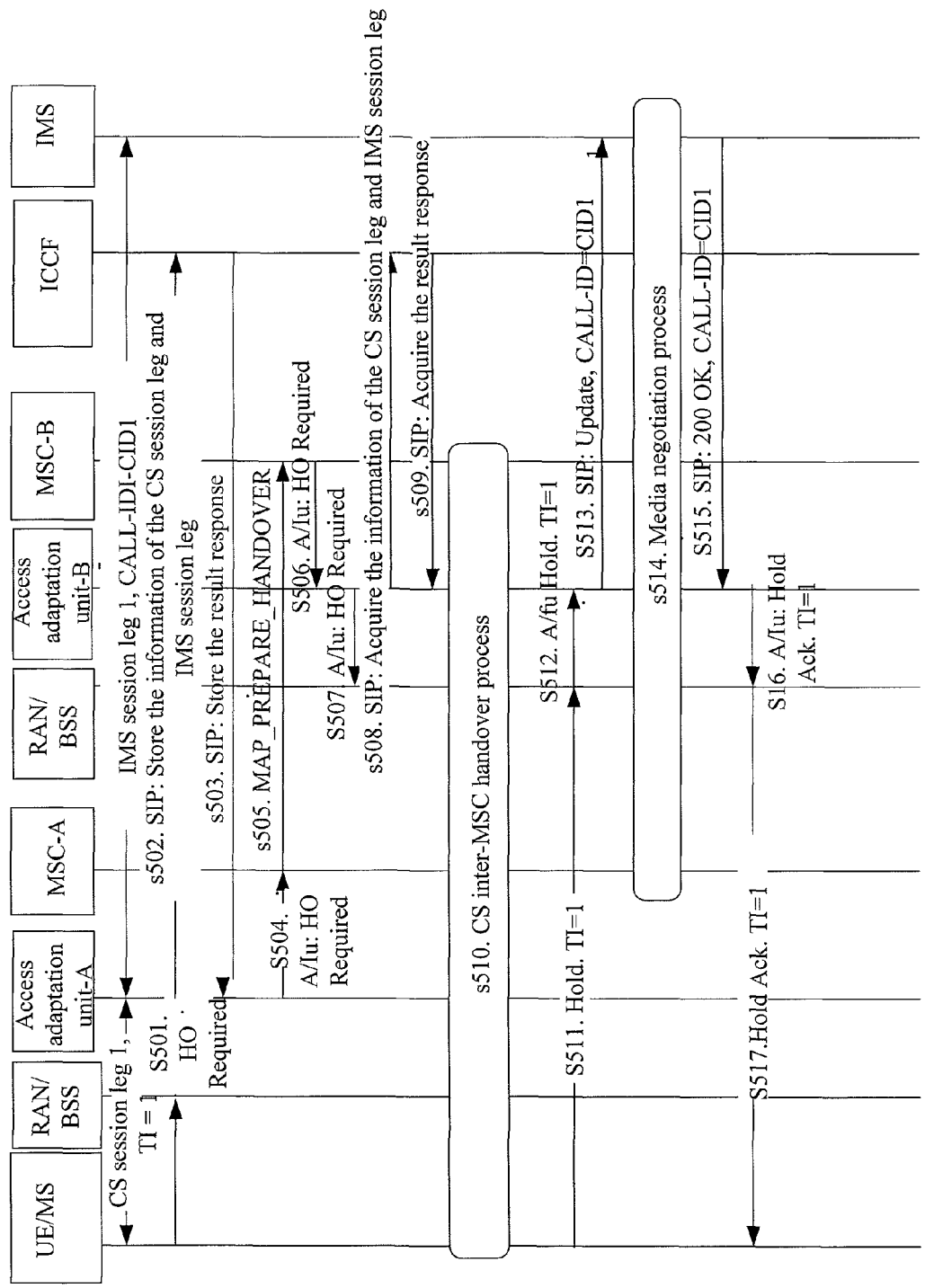
FIG. 5 is a flowchart of a third embodiment of the invention.

In the third embodiment of the present invention, the UE sets up a session through the access adaptation unit-A, MSC-A, and IMS network. For the session, the identifier of the CS session leg is 1 and that of the IMS session leg is CID1. An inter-MSC handover occurs because the UE moves. After perceiving the handover, the access adaptation unit-A stores corresponding conversion-related information of the CS session leg and IMS session leg of the UE to an ICCF in the IMS domain. Then the access adaptation unit-B reads the conversion-related information of the UE from the ICCF in the IMS domain during the handover. After the handover, the session control signaling message sent from the UE is transmitted to the access adaptation unit-B in front of the MSC-B through the RAN. Then the access adaptation unit-B performs message adaptation, converts the session control signaling message into a SIP message, and transmits the SIP message to the IMS network for control. Similarly, for a SIP session control signaling message delivered by the IMS, the access adaptation unit-B performs message adaptation, converts the SIP session control signaling message into an A-interface session control signaling message or an Iu interface session control signaling message, and transmits the A-interface session control signaling message or the Iu interface session control signaling message to the UE. As shown in FIG. 5, the specific implementation process includes the following steps:

Step s501: After detecting that radio signals change, the UE sends a handover request message to the MSC-A through the RAN.

Step s502: The access adaptation unit-A intercepts the A-interface handover request message or the Iu interface handover request message and knows that the UE needs to initiate a handover. Through SIP message exchange, the access adaptation unit-A stores conversion-related information of the CS session leg and IMS session leg of the UE to an entity that is used for public information exchange, such as an ICCF in the IMS domain. The SIP message may be a SIP Info message. The Session Description Protocol (SDP) carries the information to be stored, including the user identifier, TI of the CS session leg, CALL-ID of the IMS session leg, session route information, and correspondence between the TI and CALL-ID.

The access adaptation unit-A stores conversion-related information to the IMS domain after receiving a handover request message or perceiving that a handover is required. For example, the access adaptation unit-A stores conversion-related information to the IMS domain after a HO-COMMAND message is received or after a session is set up, for example, after receiving a CONNECT or 200 OK message.

Step s503: The ICCF returns the saving result to the access adaptation unit-A.

Step s504: The access adaptation unit-A transparently transmits the A-interface handover request message or the Iu interface handover request message from the RAN to the MSC-A. This step and step s502 can be performed synchronously or in any order.

Step s505: The MSC-A sends a MAP_PREPARE_HANDOVER message to the MSC-B (the handover target).

Step s506: The MSC-B sends a handover request message to the controlled RAN through the A-interface or Iu interface.

Step s507: The access adaptation unit-B intercepts the handover request message on the A-interface or Iu interface and transparently transmits the message to the RAN through the A-interface or Iu interface.

Step s508: After knowing that the UE needs to initiate a handover to the corresponding MSC, the access adaptation unit-B performs SIP message exchange to acquire all the conversion-related information of the CS session leg and IMS session leg of the UE from an entity that is used for public information exchange, such as an ICCF in the IMS domain. The SIP message may be a SIP Info message or an extended SIP message. This step and step s507 may be performed synchronously or in any order. The access adaptation unit-B acquires conversion-related information from the IMS domain after receiving a handover request message or perceiving that a handover is required, for example, after receiving a HO-Complete message.

Step s509: The ICCF returns the saving result to the access adaptation unit-B. SDP carries the information to be acquired, including the user identifier, TI of the CS session leg, CALL-ID of the IMS session leg, session route information, and correspondence between TI and CALL-ID.

Step s510: The handover is complete according to the standard CS inter-MSC handover process.

Step s511 and step s512: The user operates the man-machine interface to instruct the UE to hold session 1. At this moment, the UE sends a Hold request message in the CS domain. When the TI in the message is set to 1, it indicates that session 1 is held. Through the RAN, the message is transmitted to the access adaptation unit-B that intercepts the A-interface or the Iu interface between the RAN and the MSC-B.

Step s513: According to the stored session leg information of the UE before the handover, the access adaptation unit-B finds that the Hold request message needs to be converted into a SIP message and transmitted to the IMS domain for service control. Thus, the access adaptation unit-B converts the CS signaling of the Hold request message into a SIP request message in which CALL-ID is CID1 according to the session correspondence and other information, and then transmits the SIP request message to the IMS domain for processing. The SIP request message may or may not pass through the ICCF, which does not affect the effect of the embodiment.

Step s514: Services are processed in the IMS domain.

Step s515: The IMS returns the processing result in which CALL-ID is CID1 to the access adaptation unit B. The SIP request message may or may not pass through the ICCF, which does not affect the effect of this embodiment. The IMS domain returns the processing result to the access adaptation unit-B instead of the access adaptation unit-A because the signaling of the session is sent from the access adaptation unit-B. In addition, the access adaptation unit-A or the access adaptation unit-B may notify the IMS domain that the SIP route address changes during the handover, that is, the SIP route address is changed to the new access adaptation unit-B. Thus, the IMS domain notifies all the subsequent session control messages including the session setup message to the access adaptation unit-B.

Step s516 and step s517: The access adaptation unit-B converts the SIP response message into an A-interface CS message or an Iu interface CS message according to the session correspondence and other information and transmits the A-interface CS message or the Iu interface CS message to the RAN. Then the RAN returns the A-interface CS message or the Iu interface CS message to the UE. The TI in the A-interface CS message or the Iu interface CS message is 1. Up to now, the process of holding session 1 is complete.

The session leg information in this embodiment may be stored in an IMS function entity such as a home subscriber server (HSS) or an application server (AS) in addition to the ICCF.

Figure 6:
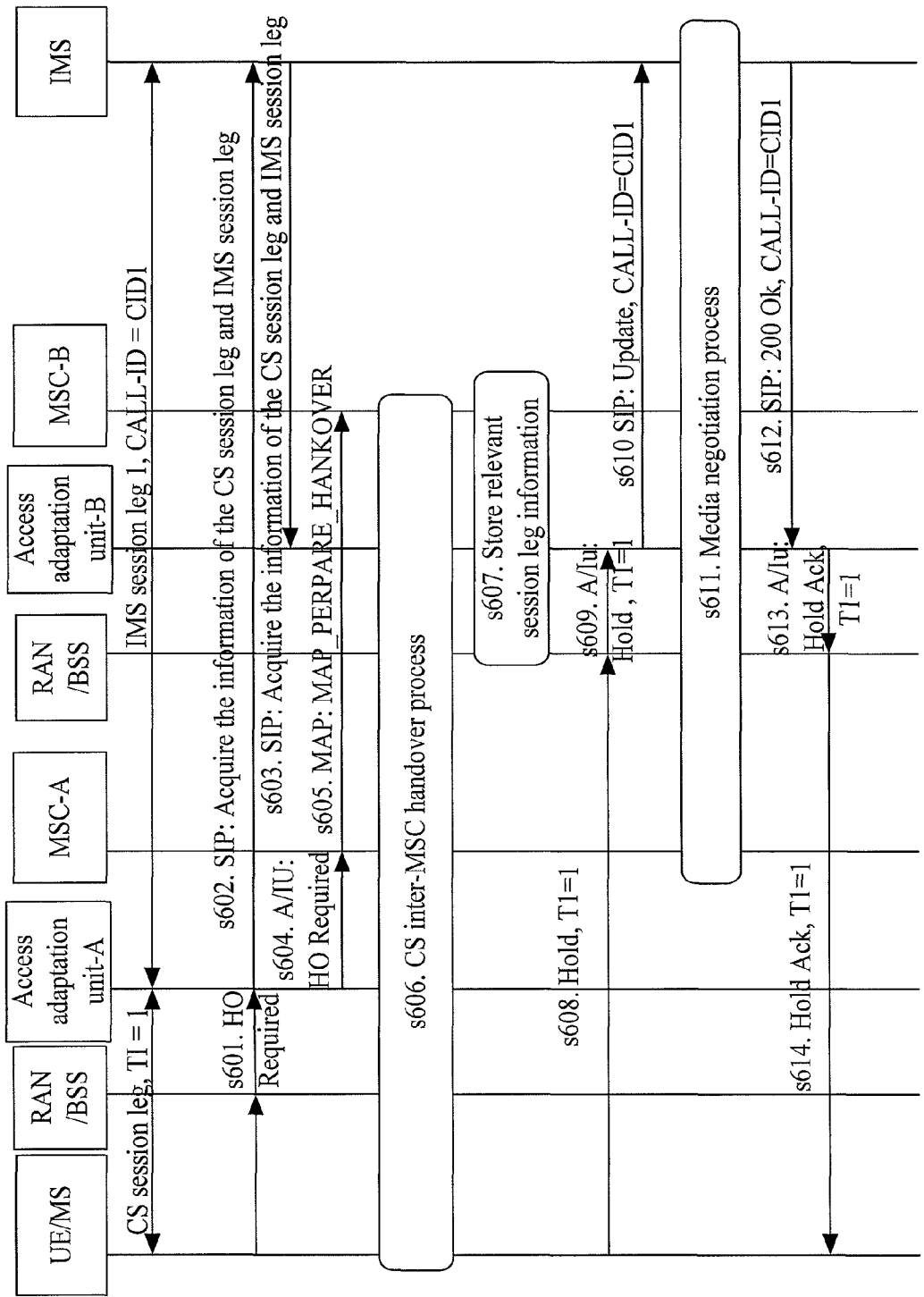
FIG. 6 is a flowchart of a fourth embodiment of the present invention.

In the fourth embodiment of the present invention, the UE sets up a session through the access adaptation unit-A, MSC-A, and IMS network. For the session, the identifier of the CS session leg is 1 and that of the IMS session leg is CID1. An inter-MSC handover occurs because the UE moves. After perceiving the handover, the access adaptation unit-A sends the corresponding information of the CS session leg and IMS session leg of the UE to the access adaptation unit-B corresponding to the target MSC-B. After the handover, the access adaptation unit-B stores the session leg information. The session control signaling message sent from the UE is transmitted to the access adaptation unit-B in front of the MSC-B through the RAN. Then the access adaptation unit-B performs message adaptation, converts the session control signaling message into a SIP message, and transmits the SIP message to the IMS network for control. Similarly, the access adaptation unit-B converts the SIP session control signaling message delivered by the IMS into an A-interface session control signaling message or an Iu interface session control signaling message, and transmits the A-interface session control signaling message or the Iu interface session control signaling message to the UE. As shown in FIG. 6, the specific implementation process includes the following steps.

Step s601: After detecting that radio signals change, the UE sends a handover request message to the MSC-A through the RAN.

Step s602: The access adaptation unit-A intercepts the handover request message on the A-interface or Iu interface to acquire a target cell and acquires the target MSC-B according to the preset correspondence between the adjacent cell information and the MSC number. Then the access adaptation unit-A generates a public service identity (PSI) number for the access adaptation unit-B according to the target MSC-B number. For example, the number format may be "MSC number@PLMN identifier." The access adaptation unit-A sends conversion-related information of the CS session leg and IMS session leg to the IMS domain through a SIP message. The destination address is the PSI number of the access adaptation unit-B. The access adaptation unit-A sends conversion-related information to the access adaptation unit-B after receiving a handover request message or perceiving that a handover is required, for example, after receiving a HO-Complete message.

Step s603: The IMS routes a SIP message to the access adaptation unit-B according to the PSI number. The SIP message may be a SIP Info message. SDP carries the information to be stored, including the user identifier, TI of the CS session leg, CALL-ID of the IMS session leg, session route information, and correspondence between TI and CALL-ID.

Step s604: The access adaptation unit-A transparently transmits the A-interface handover request message or the Iu interface handover request message from the RAN to the MSC-A. This step and step s602 may be performed synchronously or in any order.

Step s605: The MSC-A sends a MAP_PREPARE_HANDOVER message to the MSC-B (the handover target).

Step s606: The handover is complete according to the standard CS inter-MSC handover process.

Step s607: After successful handover, the access adaptation unit-B stores the session leg information sent from the access adaptation unit-A.

Step s608 and step s609: The user operates the man-machine interface to instruct the UE to hold session 1. At this moment, the UE sends a Hold request message in the CS domain. When the TI in the message is set to 1, it indicates that session 1 is held. Through the RAN, the message is transmitted to the access adaptation unit-B that intercepts the A-interface or the Iu interface between the RAN and the MSC-B.

Step s610: According to the stored conversion-related information of the UE before the handover, the access adaptation unit-B finds that the Hold request message needs to be converted into a SIP message and transmitted to the IMS domain for service control. Thus, the access adaptation unit-B converts the CS signaling of the Hold request message into a SIP request message in which CALL-ID is CID1 according to the session correspondence and other information, and then transmits the SIP request message to the IMS domain for processing.

Step s611: Services are processed in the IMS domain.

Step s612: The IMS returns the processing result to the access adaptation unit-B. In the processing result, CALL-ID is CID1. The IMS domain returns the processing result to the access adaptation unit-B instead of the access adaptation unit-A because the signaling of the session is sent from the access adaptation unit-B. In addition, the access adaptation unit-A or the access adaptation unit-B may notify the IMS domain that the SIP route address changes during the handover, that is, the SIP route address is changed to the new access adaptation unit-B. Thus, the IMS domain notifies all the subsequent session control messages including the session setup message and the notification or request message of the ongoing session to the access adaptation unit-B.

Step s613 and step s614: The access adaptation unit-B converts the SIP response message into an A-interface CS message or an Iu interface CS message according to the conversion-related information, and transmits the A-interface CS message or the Iu interface CS message to the RAN. Then the RAN returns the A-interface CS message or the Iu interface CS message to the UE. The TI in the A-interface CS message or the Iu interface CS message is 1. Up to now, the process of holding session 1 is complete.

In the embodiment, during the handover, the original access adaptation unit-A may actively send conversion-related information to the target access adaptation unit-B or the target access adaptation unit-B may send an information query request to the original access adaptation unit-A. The information query request may be triggered when the access adaptation unit-B receives a handover request message or perceives that a handover is required, for example, when a HO-Complete message is received. Moreover, in addition to notifying and querying conversion-related information through a SIP message, the original access adaptation unit-A and the new access adaptation unit-B may intercept the E-interface between two MSCs and transmit relevant data through an extended E-interface such as an extended MAP_PREPARE_HANDOVER or other messages.

Figure 7:
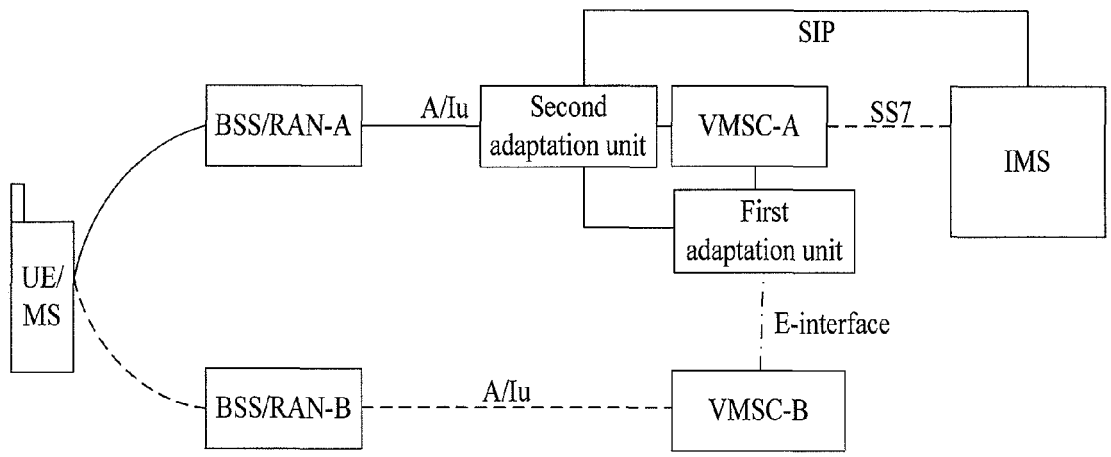
FIG. 7 shows a structure of a system according to the first and second embodiments of the present invention.

An embodiment of the present invention provides a system for converting session control signaling. The system is applicable to scenarios in the first and second embodiments. The E-interface adaptation unit-A in the first and second embodiments corresponds to the first adaptation unit and the access adaptation unit-A corresponds to the second adaptation unit. As shown in FIG. 7, the system includes a UE (or an MS), an initial session RAN (BSS or RAN-A), an initial session processing node (VMSC-A), an after-handover session RAN (BSS or RAN-B), an after-handover session processing node (VMSC-B), an IMS domain, a first adaptation unit, and a second adaptation unit. The second adaptation unit is on the A-interface or Iu interface between the BSS (or RAN-A) and the VMSC-A and is adapted to communicate with the IMS domain through SIP signaling or other signaling such as USSD signaling. The first adaptation unit is on the initial session processing node and is adapted to convert CS E-interface signaling and IMS signaling.

Figure 8:
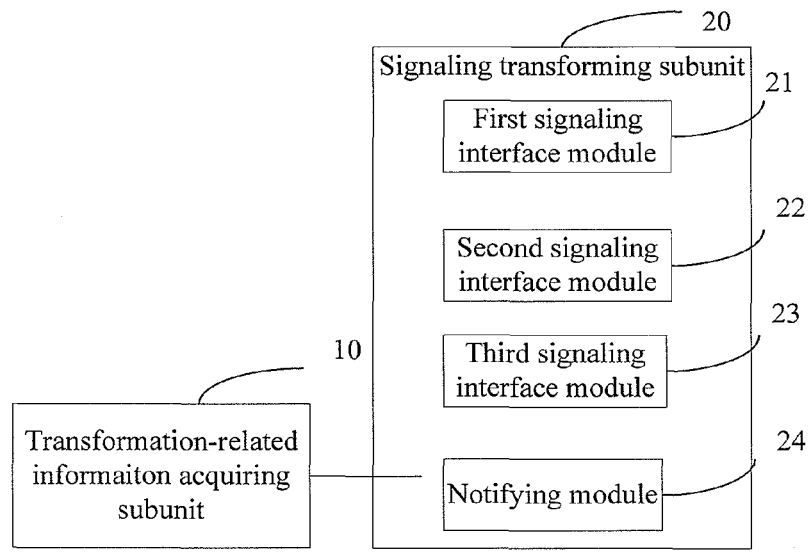
FIG. 8 shows a structure of a first adaptation unit according to an embodiment of the present invention.

As shown in FIG. 8, the first adaptation unit includes a conversion-related information acquiring subunit 10 and a signaling converting subunit 20. The conversion-related information acquiring subunit 10 is adapted to acquire conversion-related information of the CS session leg and IMS session leg. The conversion-related information acquiring subunit 10 acquires the conversion-related information through an internal interface of the second adaptation unit when the first adaptation unit and the second adaptation unit are in the same physical entity or acquires the conversion-related information through an interworking interface of the second adaptation unit when the first adaptation unit is in a different physical entity from the second adaptation unit. The signaling converting subunit 20 is connected to the conversion-related information acquiring subunit 10 and is adapted to perform signaling conversion between the CS domain and the IMS domain according to the conversion-related information. Specifically, the signaling converting subunit 20 exchanges signaling with the IMS domain through the second adaptation unit or notifies the IMS domain that the route address is changed to the first adaptation unit. In this way, the IMS domain switches the session connection relation from the second adaptation unit to the first adaptation unit. Then the first adaptation unit directly exchanges signaling with the IMS domain.

The signaling converting subunit 20 further includes: (1) a first signaling interface module 21, adapted to exchange signaling with the IMS domain through the second adaptation unit; (2) a second signaling interface module 22, adapted to directly exchange signaling with the IMS domain; (3) a third signaling interface module 23, adapted to exchange signaling with the CS after-handover session processing node; and (4) a notifying subunit 24, adapted to notify the IMS domain that the route address is changed to the first adaptation unit, so that the IMS domain switches the session connection relation from the second adaptation unit to the first adaptation unit.

The first signaling interface module 21 and the second signaling interface module 22 may exist concurrently or only one of them exists. When the second signaling interface module 22 does not exist, the notifying subunit 24 does not exist, either.

When the second adaptation unit is in the same physical entity as the first adaptation unit, the first adaptation unit further includes an internal interface to acquire the stored conversion-related information of the CS session leg and IMS session leg during session setup. When the second adaptation unit is in a different physical entity from the first adaptation unit, the first adaptation unit further includes an interworking interface to acquire the conversion-related information of the CS session leg and IMS session leg during session setup.

The system in this embodiment may also include a third adaptation unit. The third adaptation unit is on the after-handover session processing node and is specifically on the A-interface or Iu interface between the UE and the after-handover session processing node. It is adapted to shield signaling conversion when a handover is perceived.

Figure 9:
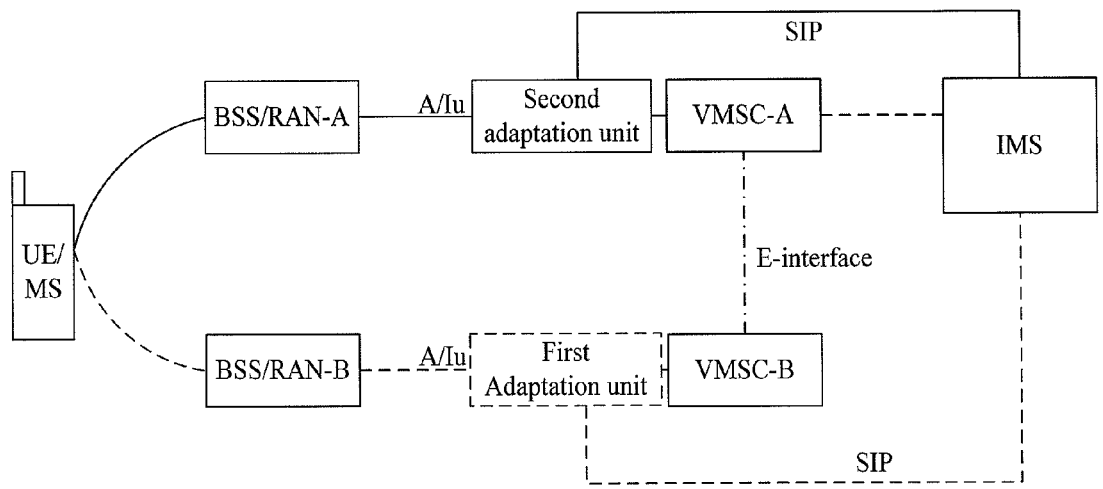
FIG. 9 shows a structure of a system according to the third and fourth embodiments of the present invention.

An embodiment of the present invention also provides a system for converting session control signaling. The system is applicable to scenarios in the third and fourth embodiments. The access adaptation unit-B in the third and fourth embodiments corresponds to the first adaptation unit and the access adaptation unit-A corresponds to the second adaptation unit. As shown in FIG. 9, the system includes a UE (or an MS), an initial session RAN (BSS or RAN-A), an initial session processing node (VMSC-A), an after-handover session RAN (BSS or RAN-B), an after-handover session processing node (VMSC-B), an IMS domain, a first adaptation unit, and a second adaptation unit. The second adaptation unit is on the A-interface or Iu interface between the BSS (or RAN-A) and the VMSC-A and is adapted to communicate with the IMS domain through SIP signaling or other signaling such as USSD signaling. The first adaptation unit is on the after-handover session processing node and is adapted to convert CS E-interface signaling and IMS signaling.

Figure 10:
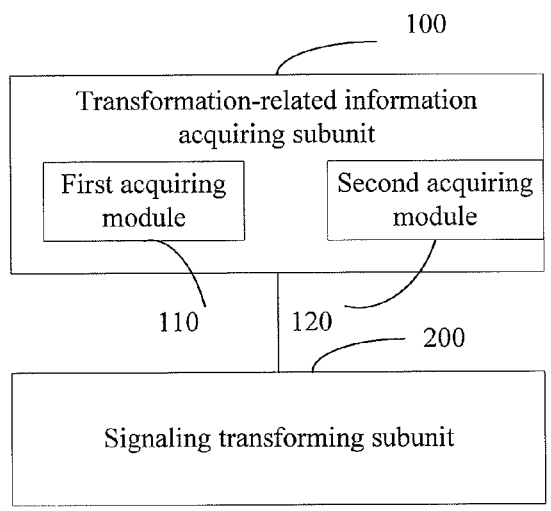
FIG. 10 shows a structure of the first adaptation unit according to an embodiment of the present invention in FIG. 9.

As shown in FIG. 10, the first adaptation unit further includes: (1) a conversion-related information acquiring subunit 100, adapted to acquire the conversion-related information of the CS session leg and IMS session leg from the home ICCF of the user or by exchanging data with the second adaptation unit; and (2) a signaling converting subunit 200, connected to the conversion-related information acquiring subunit 100 and adapted to perform signaling conversion between the CS domain and the IMS domain according to the conversion-related information.

The conversion-related information acquiring subunit 100 includes a first acquiring module 110. The first acquiring module 110 is adapted to acquire conversion-related information of the CS session leg and IMS session leg from the home ICCF of the user. The second adaptation unit stores the session-related information to the ICCF after a session is set up or when it is perceived that the UE initiates an inter-MSC handover.

When the system also includes an ICCF, the conversion-related information acquiring subunit 100 further includes a second acquiring module 120 that is adapted to acquire the conversion-related information of the CS session leg and IMS session leg. The second adaptation unit acquires the address information of the first adaptation unit according to the target cell number during handover and notifies the conversion-related information to the first adaptation unit; or the first adaptation unit acquires the address information of the second adaptation unit according to the source cell number during the handover and initiates a query request to the address of the second adaptation unit to acquire conversion-related information; or the second adaptation unit and the first adaptation unit transmit conversion-related information through the extended E-interface protocol.

In embodiments of the present invention, an adaptation unit intercepts a CS signaling message after an inter-MSC handover, and converts CS signaling messages to IMS signaling messages and vice versa, so that the IMS domain may continue to control a session after the inter-MSC handover. The IMS is defined in Third Generation Partnership Project (3GPP) standards. In 3GPP2 and Telecommunications and Internet converged Services and Protocols for Advanced Networking (TISPAN) standards, a similar multimedia subsystem is defined. To simplify descriptions, the present invention describes only the IMS but it is apparent that the methods herein are also applicable to the systems defined by 3GPP2 and TISPAN.

Through the preceding description of embodiments of the present invention, it is understandable to those skilled in the art that the embodiments of the present invention may be implemented by hardware or by software in combination with a necessary hardware platform. Thus, the technical solution of the present invention may be made into software. The software may be stored in a non-volatile storage medium such as a compact disc-read only memory (CD-ROM), a USB disk, or a mobile hard disk, and include several instructions that instruct a computer device such as a personal computer, a server, or a network device to perform the methods provided in each embodiment of the present invention.

Although the present invention has been described through several exemplary embodiments, the invention is not limited to such embodiments. It is apparent that those skilled in the art may make various modifications and variations to the invention without departing from the spirit and scope of the invention. The invention is intended to cover the modifications and variations provided that they fall in the scope of protection defined by the following claims or their equivalents.

What is claimed is:

1. A method for converting session control signaling, comprising:
    performing a signaling conversion, by a first adaptation unit, between a session control signaling message of a circuit switched (CS) session leg and a session control signaling message of an IP multimedia subsystem (IMS) session leg, wherein the first adaptation unit is on a CS signaling path after a cross mobile switching center (MSC) handover;
    wherein:
    the first adaptation unit is on an initial session processing node;
    an after-handover session processing node exists on a signaling path between the first adaptation unit and user equipment (UE), wherein the initial session processing node and the after-handover session processing node are located in different mobile switching centers (MSCs);
    the session control signaling message of the CS session leg connected to the first adaptation unit is an E-interface signaling message; and
    the session control signaling message of the IMS session leg connected to the first adaptation unit is a Session Initiation Protocol (SIP) signaling message.

2. The method of claim 1, before the first adaptation unit performs signaling conversion, the method further comprising:
    acquiring, by the first adaptation unit, conversion-related information of the CS session leg and IMS session leg from a second adaptation unit.

3. The method of claim 2, wherein the first adaptation unit acquires the conversion-related information from the second adaptation unit in at least one of the following modes:
    when the first adaptation unit is in a same physical entity as the second adaptation unit, the first adaptation unit acquires the conversion-related information through an internal interface of the second adaptation unit; and
    when the first adaptation unit is in a different physical entity from the second adaptation unit, the first adaptation unit acquires the conversion-related information through an interworking interface of the second adaptation unit.

4. The method of claim 1, wherein the after-handover session processing node includes an access adaptation unit transparently transmitting all the CS session leg signaling.

5. The method of claim 1, wherein the first adaptation unit exchanges the session control signaling message with an IMS domain.

6. The method of claim 5, wherein the first adaptation unit exchanges signaling with the IMS domain through a second adaptation unit.

7. The method of claim 5, wherein before the first adaptation unit exchanges signaling with the IMS domain, the method further comprises:
    notifying, by one of the first and the second adaptation units, the IMS domain that a route address is changed to the first adaptation unit so that the IMS domain switches a session connection relation from the second adaptation unit to the first adaptation unit.

8. The method of claim 2, wherein the second adaptation unit is an access adaptation unit on the initial session processing node.

9. The method of claim 2, wherein the conversion-related information comprises at least one of the following: a CS session identifier, route information of a CS session, an IMS session identifier, and route information of an IMS session.

10. The method of claim 1, wherein the session control signaling message comprises at least one of the following: a session setup message, a session release message, a notification or request message of an ongoing session, and a supplementary service control message.

11. A system for converting session control signaling, comprising:
    an after-handover session processing node residing on a signaling path between a first adaptation unit and a user equipment (UE); wherein the first adaptation unit is on an initial session processing node, wherein the initial session processing node and the after-handover session processing node are located in different mobile switching centers (MSCs); and
    the first adaptation unit adapted to perform a signaling conversion between a session control signaling message of a circuit switched (CS) session leg and a session signaling message of an IP multimedia subsystem (IMS) session leg,
    wherein the session control signaling message of the CS session leg connected to the first adaptation unit is an E-interface signaling message and the session control signaling message of the IMS session leg connected to the first adaptation unit is a Session Initiation Protocol (SIP) signaling message.

12. The system of claim 11, the first adaptation unit further comprising:
- a conversion-related information acquiring subunit, adapted to acquire conversion-related information of the CS session leg and IMS session leg from a second adaptation unit; and
- a signaling converting subunit, connected to the conversion-related information acquiring subunit and adapted to perform signaling conversion between a CS domain and an IMS domain according to the conversion-related information.

13. The system of claim 11, wherein an access adaptation unit resides on the after-handover session processing node and transparently transmits all the CS session leg signaling.

14. An adaptation unit, comprising:
- a conversion-related information acquiring subunit, adapted to acquire conversion-related information of a circuit switched (CS) session leg and an IP multimedia subsystem (IMS) session leg from a second adaptation unit; and
- a signaling converting subunit, connected to the conversion-related information acquiring subunit and adapted to perform signaling conversion between a CS domain and an IMS domain according to the conversion-related information;
- wherein a session control signaling message of the CS session leg connected to the first adaptation unit is an E-interface signaling message and a session control signaling message of the IMS session leg connected to the first adaptation unit is a Session Initiation Protocol (SIP) signaling message; and
- wherein the adaptation unit is on a CS signaling path after a cross mobile switching center (MSC) handover, the adaptation unit is on an initial session processing node, an after-handover session processing node exists on a signaling path between the adaptation unit and user equipment (UE) and the initial session processing node and the after-handover session processing node are located in different mobile switching centers (MSCs).

15. The adaptation unit of claim 14, wherein the signaling converting subunit further comprises:
- a first signaling interface module, adapted to exchange signaling with the IMS domain through the second adaptation unit.

16. The adaptation unit of claim 14, wherein the signaling converting subunit further comprises:
- a second signaling interface module, adapted to directly exchange signaling with the IMS domain; and
- a notifying module, adapted to notify the IMS domain that a route address is changed to a first adaptation unit, so that the IMS domain switches a session connection relation from the second adaptation unit to the first adaptation unit.

17. The adaptation unit of claim 14, wherein the signaling converting subunit further comprises a third signaling interface module adapted to exchange signaling with a CS after-handover session processing node.

18. The adaptation unit of claim 14, wherein the adaptation unit comprises an internal interface adapted to acquire the stored conversion-relation information of the CS session leg and the IMS session leg during session setup when the adaptation unit is in a same entity as the second adaptation unit.

19. The adaptation unit of claim 14, wherein the adaptation unit comprises an interworking interface adapted to acquire the stored conversion-relation information of the CS session leg and the IMS session leg during session setup when the adaptation unit is in a different entity from the second adaptation unit.

* * * * *